April 22, 1941.  J. DAUBEN  2,238,879
VEHICLE
Filed Feb. 15, 1937   2 Sheets-Sheet 1
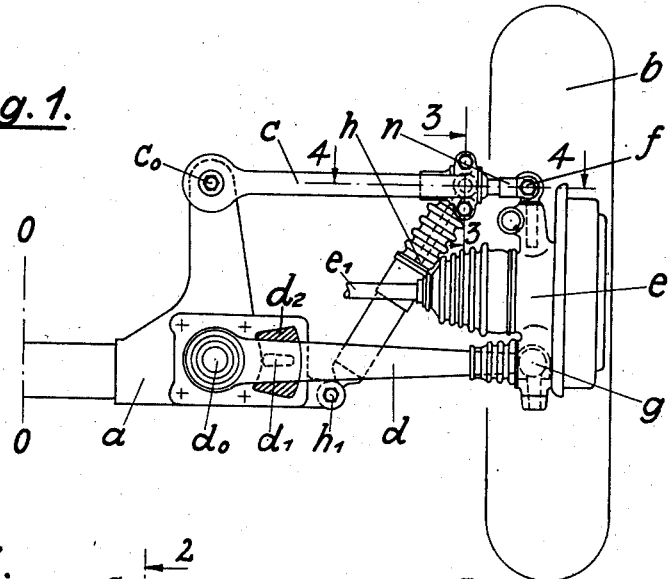
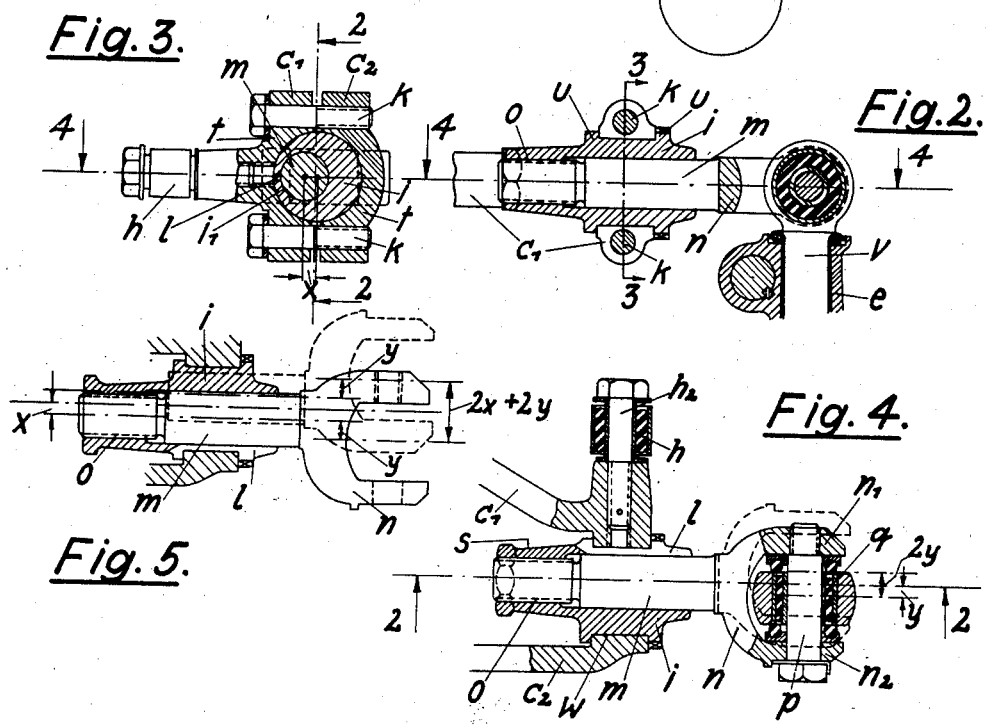
Inventor
Jacques Dauben April 22, 1941.                J. DAUBEN                    2,238,879
                                VEHICLE
                          Filed Feb. 15, 1937           2 Sheets-Sheet 2

Inventor:
JOSEPH DAUBEN
BY A. A. Hinley
ATTORNEY

Patented Apr. 22, 1941

2,238,879

UNITED STATES PATENT OFFICE 2,238,879

VEHICLE

Joseph Dauben, Stuttgart-Wurttemberg, Germany, assignor to Daimler-Benz Aktiengesellschaft, Stuttgart-Unterturkheim, Germany Application February 15, 1937, Serial No. 125,863
In Germany February 14, 1936

22 Claims. (Cl. 280—124)

(Granted under the provisions of sec. 14, act of March 2, 1927; 357 O. G. 5)

My invention relates to a vehicle and, more particularly, to an adjustable suspension of the steering wheels thereof which are individually guided for up-and-down movement relatively to the chassis by links extending between and hinged to the chassis and the wheel carrier.

The object of my invention is to provide for a simple and convenient adjustability of the position of the wheel carriers, whereby the set of the swivel journals and/or the angular position of the swivel journals within a longitudinal plane of the vehicle may be changed. Such change is desirable for the compensation of inaccuracies occurring in the manufacture, in repair work, and for other purposes.

More particularly, my invention contemplates the provision of means which permit the length of either one of the two wheel-guiding links and the relative position of the hinges thereof to be adjusted. As the wheel carrier is held by two links one above the other, it is evident that the adjustment of one link, for instance the upper one, will produce a change of the angular position of the swivel journal.

Preferably, I provide two eccentrics for this purpose arranged in tandem relationship, one of which affords a possibility of a rough adjustment, while the other one permits the fine adjustments to be made.

Further objects of my invention will appear from the description of a preferred embodiment and modifications of my invention following hereinafter, and the features of novelty will be pointed out in the claims.

In the drawings:

Fig. 1 is an elevation of a wheel suspension, the wheel and the chassis being diagrammatically illustrated only;

Fig. 2 is a sectional view of part of the mechanism shown in Fig. 1 taken along line 2—2 of Figs. 3 and 4 on an enlarged scale;

Fig. 3 is the vertical section taken taken along line 3—3 of Figs. 1 and 2;

Fig. 4 is a horizontal section taken along line 4—4 of Figs. 1, 2 and 3;

Fig. 5 shows a different adjustment of the elements in a view similar to that of Fig. 4;

Figure 6:
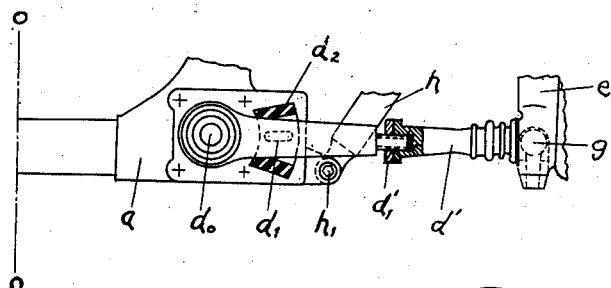
Fig. 6 is a partial view similar to Fig. 1 showing an adjustable lower link of the suspension.

The chassis or frame of a vehicle, for example of an automobile, is diagrammatically shown at $a$, the vertical longitudinal central plane of the chassis being indicated by the dash-and-dotted line 0—0. The steering wheels of the vehicle are individually connected to the chassis. In Fig. 1 one of these wheels is shown at $b$. It is guided for up-and-down movement relatively to the frame $a$ by a pair of links which extend between and are pivoted to the chassis $a$ and the wheel carrier $e$ on which the wheel $b$ is journalled. The lower link $d$ is pivoted to the chassis $a$ at $d_0$ and normally extends substantially perpendicularly to the plane 0—0 towards the wheel carrier $e$ and has a suitable connection such as ball joint $g$ therewith. Suitable cushion means, for instance rubber cushions indicated at $d_2$ are provided to limit the pivotal movement of the link $d$ about its pivot $d_0$, by engagement with the projection $d_1$ of said link.

The upper link extends substantially parallel to the lower link and is connected to the frame by a pivot $c_0$ and to the swivel pin $v$ of the wheel carrier $e$ by a pivot $f$. According to an important feature of my invention the upper link is made adjustable so as to afford a possibility of varying the distance of the pivots $c_0$ and $f$ and of displacing the pivot $f$ forwardly or rearwardly with regard to the pivot $c_0$.

For this purpose, the upper link is composed of three relatively rotatable members $m$, $i$ and $c$ which are arranged in nested relationship.

The first member forms part of the pivot $f$ and comprises a fork $n$ having arms $n_1$, $n_2$ and a pin $m$. The arms $n_1$, $n_2$ have bores for the insertion of a horizontal pivot $p$, and the pin $m$ extends transversely to the pin $p$ towards the chassis. The reduced end $o$ of the pin $m$ is threaded. The axis of the pin $m$ is spaced at the distance $y$ from the vertical central plane of the pivot, as will appear from Fig. 4.

The second member of the upper link comprises a bushing $i$ which is rotatably mounted on the pin $m$ and slotted at $l$. The bushing $i$ has an extension $s$ provided with inner threads screwed on the end $o$. The outer cylindrical surface $w$ of the bushing confined between collars $u$ has an axis within the plane 2—2, which is spaced by the distance $x$ from the axis of the pin $m$.

The third member $c$ of the link is preferably composed of two struts $c_1$ and $c_2$, Fig. 4, diverging towards the chassis and directly pivoted thereto at $c_0$. The outer ends of the struts $c_1$ and $c_2$ are formed with semi-circular heads $t$ which embrace the bushing $i$ and are seated on the surface $w$ thereof. Two horizontal bolts $k$ pass through the heads $t$ above and below the bushing $i$ and serve to clamp the two rings firmly together.

The upright swivel pin $v$ is journalled in the wheel carrier $e$ and extends into an eye which is mounted on the pin $p$, a rubber sleeve $q$ being interposed therebetween.

The links are constrained in normal position by any suitable springs, for instance by a torsional spring (not shown) coaxially arranged with the hinge $d_0$; or alternatively, by a helical spring included in a shock absorber $h$ composed of telescopic elements hinged to the chassis at $h_1$ and pivotally to a pin $h_2$ which extends rearwardly from the strut $c_1$.

Means including a shaft $e_1$ may be provided for driving the wheel $b$.

The operation of the mechanism is as follows: There are three different possibilities of adjustment:

(1) The fork $n$ having the eccentricity $y$ may be turned through 180 degrees about the axis of its pin $m$, whereby the upper pivot $f$ will be moved forwardly or rearwardly of the chassis and may be thus roughly adjusted. This adjustment affords the possibility of selecting only one or the other of two alternative positions of the pivot $f$ relative to the pin $m$, which are spaced by the distance of $2y$. As the lower ball joint $g$ retains its position, the inclination of the swivel journal will thus be varied within a plane parallel to the plane 0—0.

(2) The eccentric bushing $i$ may be rotated by a suitable tool after the bolts $k$ have been loosened and may then be firmly clamped in any desired position by tightening these bolts again. At the same time, the split bushing will be slightly compressed owing to its resiliency and will be thus firmly clamped on the pin $m$. By such rotation of the eccentric bushing $i$, the pivot $f$ may be additionally displaced forwardly or rearwardly by a distance up to $2x$, whereby the inclination of the swivel journal may be varied accordingly. This second adjustment differs from the first one in that it permits the pivot $f$ to be brought to any desired position within this range thus affording a possibility of fine adjustment of the inclination of the swivel journal.

By combining the two adjustments (1) and (2), that is to say, by turning the fork $n$ one way or the other through 180 degrees and by rotating the bushing $i$, a total forward or rearward displacement of the pivot $f$ may be attained by a distance of $2x+2y$, as illustrated in Fig. 5, provided the eccentricity $x$ is at least as large as the eccentricity $y$. Otherwise, two ranges of continuous adjustment would be obtained which are interrupted by a range to which the pivot $f$ cannot be set owing to the fact that the fork $n$ may be set to but two positions. On the other hand, when $x$ exceeds $y$, the two ranges $+y \pm x$ and $-y \pm x$ would partly overlap. For this reason, I prefer to make $x$ and $y$ equal. In this manner, the largest range of continuous adjustment is obtained. When $x$ and $y$ are four millimeters for instance, the pivot $f$ may be adjusted to any position within a range of 16 millimeters.

From the foregoing description it will be apparent that the members $i$ and $m$ constitute two eccentrics which are arranged in tandem relation so that the adjustments produced by each of them are additively combined to a total adjustment.

(3) For adjusting the camber of the swivel journals of the steering wheels, the fork $n$ is rotated a number of times after the bolts $k$ have been loosened until the pin $m$ has been screwed out or in to the desired position within the bushing $i$. Therefore, the threads on the end $o$ of the pin $m$ constitute means for displacing the members $c$ and $m$ relative to one another in their longitudinal direction.

The pitch of the thread may be made so small that this adjustment is continuous for all practical purposes.

If in addition to the adjustments described above, it is considered desirable to still further vary the wheel camber, the lower link $d$ may be ormed in the manner illustrated in Fig. 6, wherein that portion of the lower link which is pivoted to the frame has an extended threaded portion adapted to threadedly engage a recess in the remaining link portion $d'$. It will be clear that upon relative rotation of the two link portions the effective length of the link can be varied due to this threaded connection. After adjustment has been made the members can be held in their relative positions by the use of a nut $d_1'$, engaging the threaded extending portion and bearing tightly against the end of the link $d'$.

Figure 7:
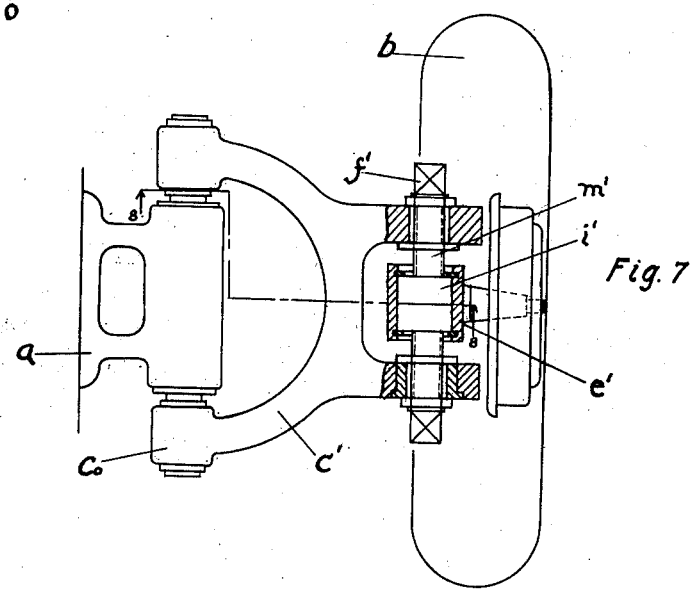
Fig. 7 is a top view partially in cross-section, illustrating a modified form of wheel suspension.
Figure 8:
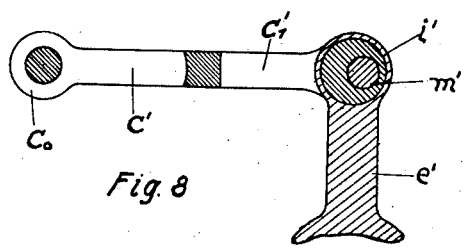
Fig. 8 is a cross sectional view along the line 8—8 of Fig. 7.

Figs. 7 and 8 illustrate a modified form of my adjustable suspension. In this example, the principle of two rotatable and slidably nestled eccentrics is maintained but in this construction he relative sliding adjusts the wheel caster whereas the relative rotation changes the wheel camber.

In this modified form of my invention the upper link $c'$ is preferably provided with two relatively widely spaced apart extending arms, in which the pin $m'$ of the pivot is journaled for rotation about an axis substantially parallel with the longitudinal central axis of the vehicle. The pin $m'$ is exteriorly threaded and shiftable in the longitudinal direction. Suitable means such as nuts $f'$ are provided at the ends of the pin $m'$ to hold it in its adjusted position. Motion of the pin $m'$ rearwardly or forwardly will vary the wheel caster.

The pin $m'$ is eccentrically carried in the rotatable bushing $i'$. Rotation of the bushing will vary the distance from the center of the vehicle, of the upper part of the wheel carrier $e'$ thereby pivoting the wheel carrier $e'$ about its pivotal connection with the lower link member, resulting in variations of wheel camber.

It is to be understood that the adjustable lower link construction illustrated in Fig. 6 can also be used with the construction illustrated in Figs. 7 and 8.

While the invention has been illustrated as applied to a driven steering wheel, it is equally applicable to wheels which have no swivel motion and/or are not driven.

The words "frame" or "chassis" as used throughout this specification and claims are not to be understood as limited to such frame or chassis when used as separate members, but to comprehend a construction in which such frame or chassis is part of or integral with the body or coachwork of the vehicle.

It will be obvious to those skilled in the art that my invention is capable of numerous further modifications and I do not intend it to be limited to the precise construction illustrated except as that set forth in the appended claims.

What I claim is:

1. In a vehicle, the combination comprising a chassis, a wheel carrier, links extending between and pivoted to said wheel carrier and said chassis for relative up-and-down guidance of said wheel carrier, at least one of said links being composed of two members, means for pivoting one of said members to said chassis and the other members to said wheel carrier, means for displacing said members relative to one another in their longitudinal direction, and means combined with said last means and including a pair of relatively rotatable eccentrics operative on rotation thereof to displace said members relative to one another in their transverse direction for respectively effecting a relatively fine or a relatively coarse adjustment, whereby said wheel carrier may be angularly adjusted within a vertical plane extending fore-and-aft of the vehicle and within a vertical plane transverse to said vehicle.

2. In a vehicle, the combination comprising a chassis, a wheel carrier, links extending between and pivoted to said wheel carrier and said chassis for relative up-and-down guidance of said wheel carrier, and means for adjusting the caster of said wheel carrier, said means comprising two eccentrics included in one of said links in tandem relation at the pivotal connection between said one link and said wheel carrier.

3. In a vehicle, the combination comprising a chassis, a wheel carrier, links extending between and pivoted to said wheel carrier and said chassis for relative up-and-down guidance of said wheel carrier, and means for adjusting the caster and camber of said wheel carrier, comprising two eccentrics in tandem relation included in and forming a part of one of said links, and adapted to be relatively rotated and to be relatively displaced in the longitudinal direction of said last-mentioned link.

4. In a vehicle, the combination comprising a chassis, a wheel carrier, links extending between and pivoted to said wheel carrier and said chassis for relative up-and-down guidance of said wheel carrier, two eccentrics included in at least one of said links in tandem relationship and positioned to be rotatable about axes extending transversely to a vertical longitudinal plane of said chassis, whereby said wheel carrier may be angularly adjusted within said longitudinal plane, and means for relatively guiding said eccentrics in the direction of said links, whereby said wheel carrier may be angularly adjusted transversely to said plane.

5. In a vehicle, the combination comprising a chassis, a wheel carrier, links extending between and pivoted to said wheel carrier and said chassis for relative up-and-down guidance of said wheel carrier, at least one link being composed of three relatively rotatable members arranged in nested relationship, one of said members being integral with a hinge connected to said carrier and having an axis spaced from the vertical central plane of said hinge, the second member being pivoted to said chassis and having an axis spaced from said first-mentioned axis, and the third member interposed between said first-mentioned and said second member and being formed by an eccentric bushing.

6. In a vehicle, the combination comprising a chassis, a wheel carrier, and means for guiding the same for relative up-and-down movement, said means including a pivot member connected to said wheel carrier and integral with a substantially horizontal pin extending transversely to the axis of the hinge towards said chassis, an eccentric bushing rotatable mounted on said pin, and a member embracing said bushing and pivoted to said chassis, the axis of said pin being spaced from the central vertical plane of said pivot, whereby said wheel carrier may be roughly adjusted by turning said hinge member through 180 degrees and finely adjusted by turning said bushing.

7. In a vehicle the combination comprising a chassis, a wheel carrier, links extending between and pivoted to said wheel carrier and said chassis for relative up-and-down guidance of said wheel carrier, at least one link being composed of three relatively rotatable members arranged in nested relationship, one of said members being integral with a pivot connected to said carrier and having an axis spaced from the vertical central plane of said pivot, the second member being pivoted to said chassis and having an axis spaced from said first-mentioned axis, and the third member interposed between said first-mentioned and said second member and being formed by an eccentric bushing, said second member being screwed on said third member.

8. In a vehicle, the combination comprising a chassis, a wheel carrier, links extending between and pivoted to said wheel carrier and said chassis for relative up-and-down guidance of said wheel carrier, and two eccentrics of equal eccentricity relatively rotatable one within the other and included in at least one of said links, whereby said wheel carrier may be angularly adjusted.

9. In a vehicle, the combination comprising a chassis, a wheel carrier, and means for guiding the same for relative up-and-down movement, said means including a pivot member connected to said wheel carrier and integral with a substantially horizontal pin, a split eccentric bushing rotatably mounted on said pin, a member embracing said bushing and pivoted to said chassis, and means for firmly clamping said bushing to said pin.

10. In a vehicle, the combination comprising a chassis, a wheel carrier, and means for guiding the same for relative up-and-down movement, said means including a pivot member connected to said wheel carrier and integral with a substantially horizontal pin, a split eccentric bushing rotatably mounted on said pin, a two-part member embracing said bushing and pivoted to said chassis, and bolts for clamping said two-part member, said bushing and said pin firmly together.

11. The combination according to claim 1, including means for adjusting the length of the other of said links.

12. The combination according to claim 2, including means for adjusting the length of the other of said links.

13. The combination according to claim 3, including means for adjusting the length of the other of said links.

14. The combination according to claim 8, including means for adjusting the length of the other of said links.

15. In a vehicle, the combination comprising a chassis, a wheel carrier, links extending between and pivoted to said wheel carrier and said chassis for relative up-and-down guidance of said wheel carrier, at least one of said links being composed of two members, means for pivoting one of said members to said chassis and the other member to said wheel carrier, a bushing on one of said members, an eccentric rotatable and axially shiftable in said bushing for displacing said members relatively to one another in their longitudinal direction and in their transverse direction, and means for securing said members to one another in desired position, whereby said wheel carrier may be angularly adjusted for camber and caster.

16. In a vehicle, the combination comprising a chassis, a wheel carrier, links extending between and pivoted to said wheel carrier and said chassis for relative up and down guidance of said wheel carrier, at least one of said links being composed of two members, means for pivoting one of said members to said chassis and the other member to said wheel carrier, a bushing on one of said members, an eccentric rotatable and axially shiftable in said bushing for displacing said members relative to one another in their longitudinal direction, and means combined with said eccentric and operative on rotation thereof to displace said members relative to one another in their transverse direction, whereby said wheel carrier may be angularly adjusted for camber and caster.

17. The combination according to claim 18, including means for adjusting the length of the other of said links.

18. In a vehicle having a frame, in combination, a wheel supporting member, a pair of links each pivotally connected to said frame and to said wheel supporting member, and combined means intermediate one of said links and said wheel supporting member for independently adjusting the caster and camber of said wheel supporting member, said combined means including a rotatable pin for making one of said adjustments and an eccentric rotatably mounted on said pin for making the other of said adjustments.

19. The combination according to claim 18 in which said pin is positioned substantially parallel to the longitudinal central axis of the vehicle.

20. The combination according to claim 18 in which said pin is positioned substantially transverse to the longitudinal central axis of said vehicle.

21. The combination according to claim 18, in combination with a second eccentric serially effective with said first eccentric.

22. The combination according to claim 18, in combination with a second eccentric serially effective with said first eccentric, the axis of rotation of both eccentrics being substantially transverse to the central longitudinal axis of the vehicle.

JOSEPH DAUBEN.